United States Patent [19]

Maxey

[11] 3,852,251

[45] Dec. 3, 1974

[54] TWO-COMPONENT ACCELERATOR SYSTEM FOR VULCANIZABLE RUBBERS

[75] Inventor: Frank S. Maxey, Akron, Ohio

[73] Assignee: The Goodyear Tire & Rubber Company, Akron, Ohio

[22] Filed: Apr. 18, 1972

[21] Appl. No.: 245,264

[52] U.S. Cl........ 260/79.5 B, 252/182, 260/79.5 C, 260/785, 260/786, 260/887
[51] Int. Cl..... C08c 11/62, C08d 9/00, C08f 27/06
[58] Field of Search.......... 260/79.5 R, 79.5 B, 785, 260/786; 252/182

[56] References Cited
UNITED STATES PATENTS

| | | | |
|---|---|---|---|
| 2,199,105 | 4/1940 | Jones | 260/780 |
| 3,557,028 | 1/1971 | Turk | 260/5 |

*Primary Examiner*—Christopher A. Henderson
*Attorney, Agent, or Firm*—F. W. Brunner; J. A. Rozmajzl

[57] ABSTRACT

Two-component accelerator system for the sulfur vulcanization of rubber, one accelerator being 2-(morpholinodithio)-benzothiazole and a second accelerator being a compound such as benzothiazyl disulfide.

7 Claims, No Drawings

TWO-COMPONENT ACCELERATOR SYSTEM FOR VULCANIZABLE RUBBERS

This invention relates to an improved accelerator system for the sulfur vulcanization of rubber. More particularly it relates to a two-component accelerator system which provides a vulcanized rubber possessing improved physical properties.

Rubber compounders are constantly searching for improved accelerator systems for the sulfur vulcanization of rubber. Such accelerator systems should preferably provide good scorch resistance, reasonable vulcanization rates and adequate physical properties, both aged and unaged.

It is an object of this invention to provide an accelerator system to be used in the vulcanization of rubber. It is a further object of this invention to provide an accelerator system which provides, on vulcanization, a vulcanizate having improved physical properties. It is another object of this invention to provide vulcanizable rubber compositions which are capable of being vulcanized to provide improved vulcanizates. Other objects will become apparent subsequently herein.

The objects of the present invention are accomplished by vulcanizing a rubbery composition containing free sulfur and an accelerator system comprising (A) 2-(morpholinodithio)-benzothiazole and (B) a second accelerator which is a benzothiazole.

The second accelerator has the following structural formula:

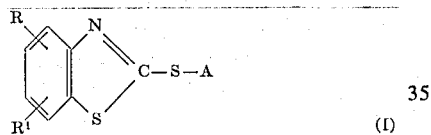

wherein A is selected from the group consisting of hydrogen,

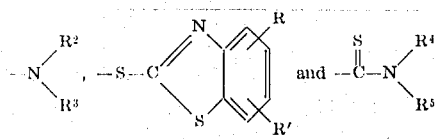

wherein R and R$^1$ are selected from the group consisting of hydrogen, nitro, chloro, alkyl radicals having from 1 to 4 carbon atoms and alkoxy radicals having from 1 to 4 carbon atoms and wherein R$^2$ and R$^3$ are selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and R$^2$ and R$^3$ can be joined through a member selected from the group consisting of —CH$_2$— and —S— to constitute with the attached nitrogen group a heterocyclic radical. Where A is

R$^3$ can also be hydrogen.

Specific examples of the derivative of the second accelerator conforming to above recited structural formula I when A is

are represented below by listing of specific radicals, any combination of which in structural formula I above represents a specific second accelerator. R and R$^1$ can be the same or different.

| R | R$^1$ | (R$^2$–R$^3$) | Where R$^2$ and R$^3$ together with the nitrogen form a heterocyclic ring |
|---|---|---|---|
| hydrogen | methyl | methyl | |
| methyl | ethyl | ethyl | pyrrolidinyl |
| methoxy | isopropyl | isopropyl | piperidino |
| ethoxy | cyanoethyl | cyanoethyl | cyclohexamethyleneamino |
| nitro | n-butyl | n-butyl | |
| chloro | sec.butyl | sec.butyl | |
| | tert.butyl | tert.butyl | N-methylpiperizinyl |
| | cyclohexyl | cyclohexyl | 3-methylpiperidino |
| | | | 2-methylpiperidino |
| | | | 4-methylpiperidino |

Particularly preferred second accelerators are the following.
benzothiazyl disulfide
N-(cyclohexyl)-2-benzothiazolesulfenamide
N-(t-butyl)-2-benzothiazolesulfenamide
N,N-(diisopropyl-2-benzothiazolesulfenamide
N,N-(diethyl)-2-benzothiazolesulfenamide
N-(octyl)-2-benzothiazolesulfenamide
2-(3-methylpiperidinothio)-benzothiazole The following compounds illustrate the second accelerator of structural formula I when A is a substituted or unsubstituted benzothiazole radical.
benzothiazyl disulfide
2-(5-chlorobenzothiazolyl) disulfide
2-(6-nitrobenzothiazolyl) disulfide
2-(6-ethoxybenzothiazolyl) disulfide When A is hydrogen the second accelerator of structural formula I can be a compound such as 2-mercaptobenzothiazole.

When A is

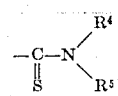

illustrative compounds are as follows.
2-benzothiazyl N,N-dimethylthiocarbamoyl sulfide
2-benzothiazyl N,N-diethylthiocarbamoyl sulfide
2-benzothiazyl N,N-diisopropylthiocarbamoyl sulfide The 2-(morpholinodithio)-benzothiazole (MDB) is well known in the art and can be prepared by well known processes such as that described in U.S. Pat. No. 2,837,519.

The second accelerators are well known in the art and can be prepared by well known processes such as those described in U.S. Pat. Nos. 1,631,871; 2,024,575; 2,045,888; 2,191,656 and 2,615,893.

The accelerator system of the present invention is used in vulcanizable rubbery compositions, compounded or uncompounded, along with 0.10 to 3.25 parts by weight of free sulfur based on 100 parts by weight of uncompounded rubber. The MDB must be 40 percent to 80 percent (preferably 50 to 70 percent) by weight of the total MDB/ATM combination. That is, the weight ratio of the MDB to the ATM compound is from ⅔ to 4/1.

The accelerator level varies from 0.50 to 3.25 parts by weight per 100 parts by weight of uncompounded rubber. Improvements in physical properties are obtained at low sulfur levels, i.e., from 0.10 to and including 1.25 parts of free sulfur based on 100 parts by weight of uncompounded rubber. Improvements are also obtained when a high sulfur level (above 1.25 parts and up to 3.25 parts of free sulfur) is used. The present invention, however, is generally most beneficial at low sulfur levels.

The sum of the two-component accelerator system and the sulfur ranges from 2.25 to 5.50 parts by weight per 100 parts by weight of rubber.

The accelerator can be compounded into the rubber by any conventional method, such as by addition to the rubber on a mill or a Banbury when the rubber is a solid. The rubbers can contain any conventional compounding ingredients such as carbon black, zinc oxide and even other accelerators to the extent that the accelerators do not interfere substantially with the improvement offered by the accelerator system of the present invention.

The rubber vulcanizates prepared using this accelerator system can be used in any of their normal applications, such as in pneumatic vehicle tires and industrial products.

Some of the following examples are intended to illustrate but not to limit the practice of the present invention. Unless indicated otherwise, all parts are parts by weight.

Natural rubber, SBR (rubbery butadiene-1,3/styrene copolymers) and NBR (rubbery butadiene-1,3/acrylonitrile copolymers) were compounded with the accelerator system of the present invention at both high and low levels of sulfur using conventional Banburying and milling procedures. The productive stocks were then vulcanized and tested.

The non-productive formulations for the compounded rubbers were as follows in parts by weight.

| Ingredients | Formulations | | |
|---|---|---|---|
| | A | B | C |
| Natural | 100.0 | | |
| SBR 1500 | | 100.0 | |
| 67/33 butadiene-1,3/acrylonitrile | | | 100.0 |
| zinc oxide | 5.0 | 3.0 | 5.0 |
| stearic acid | 1.0 | 2.0 | 1.0 |
| amine antioxidant | 1.0 | 1.0 | 1.0 |
| HAF black | 40.0 | 40.0 | 40.0 |
| petroleum softener | 3.0 | | |
| dibutyl phthalate | | | 5.0 |
| processing oil | | 5.0 | |

Formulation A was used in preparing Examples 1 to 5. Formulation B was used in preparing Examples 6 to 10. Formulation C was used in preparing Examples 11 to 15. Examples 4, 5, 9, 10, 14 and 15 illustrate the practice of the present invention. It is understood in each of the following examples that in addition to the sulfur and accelerator amounts indicated, the rubbers also contained the ingredients indicated in the non-productive formulations recited earlier herein.

| Examples 1 to 5 (Natural Rubber — Low Sulfur) | | | | | |
|---|---|---|---|---|---|
| | 1 | 2 | 3 | 4 | 5 |
| Sulfur | 0.3 | 0.3 | 0.3 | 0.3 | 0.3 |
| MDB(1) | 3.0 | | | 1.5 | 1.5 |
| MBTS(2) | | 3.0 | | 1.7 | |
| CBS(3) | | | 3.0 | | 1.5 |
| OCT(4) | 28 | 58 | 25 | 30 | 25 |
| Scorch(5) | 30+ | 30+ | 30 | 30+ | 30 |
| T(6) | 275 | 243 | 276 | 280 | 288 |
| E(6) | 550 | 800 | 540 | 540 | 550 |
| 300M(7) | 116 | 65 | 115 | 104 | 104 |
| Shore A(7) | 62 | 56 | 62 | 60 | 62 |
| Tear(8) | 92 | 63 | 94 | 85 | 96 |
| Aged(9) | | | | | |
| T | 243 | 214 | 219 | 236 | 232 |
| E | 430 | 260 | 270 | 460 | 470 |
| Aged | | | | | |
| 300M | 133 | | | 112 | 126 |
| Shore A | 63 | 54 | 65 | 64 | 65 |
| Flex(10) | | | | | |
| Orig. | 100 | 180 | 100 | 113 | 113 |
| Aged | 83 | 39 | 73 | 88 | 93 |
| GF(11) | | | | | |
| Orig. | 20.1 | 26.1 | 19.0 | 20.3 | 19.0 |
| Aged | 18.8 | 23.1 | 21.4 | 22.9 | 20.5 |
| Rebound | | | | | |
| 25°C. | 78.0 | 72.4 | 72.9 | 73.2 | 73.0 |
| 100°C. | 84.1 | 80.1 | 81.4 | 82.6 | 84.0 |

(1) 2-(morpholinodithio)-benzothiazole
(2) benzothiazyl disulfide
(3) N-cyclohexyl-2-benzothiazolesulfenamide
(4) Optimum cure time (OCT) was determined using the Monsanto Rheometer, 100 CPM 3° arc, 143°C.
(5) Mooney Scorch at 120°C., Δ5.
(6) T/E is a measure of the tensile strength and elongation (Kg/cm$^2$ and %).
(7) 300M is a measurement of the stress at 300% elongation. Shore A is a measure of the hardness as measured by the Shore A durometer.
(8) Crescent tear test (Die C).
(9) Aged T/E is tensile and elongation properties measured after the samples had been aged in a hot air oven for 70 hours at 100°C.
(10) Flex test is the Goodyear 66⅔% Flex test. Original tests were run at 25°C. while aged refers to the flex test results run after the samples had been aged in a hot air oven for 22 hours at 100°C.
(11) Goodrich Flexometer, ΔT(°C.)

The vulcanizate of Example 4 possessed aged Flex superior to either the MDB (Example 1) or MBTS (Example 2) alone. Its aged T/E was also superior to that of MBTS alone, and its original Flex superior to that of MDB alone. The Flex of Example 5 was superior to either MDB or CBS (Example 4) alone.

| Examples 6 to 10 (SBR — Low Sulfur) | | | | | |
|---|---|---|---|---|---|
| | 6 | 7 | 8 | 9 | 10 |
| Sulfur | 0.3 | 0.3 | 0.3 | 0.3 | 0.3 |
| MDB | 3.0 | | | 1.5 | 1.5 |
| MBTS | | 3.5 | | 1.7 | |
| CBS | | | 3.0 | | 1.5 |
| OCT | 33 | 43 | 37 | 33 | 30 |
| Scorch | 30+ | 30+ | 30+ | 30+ | 30+ |
| T | 236 | 180 | 230 | 248 | 253 |
| E | 530 | 700 | 560 | 560 | 560 |
| 300M | 98 | 56 | 100 | 105 | 105 |
| Shore A | 62 | 60 | 63 | 61 | 62 |
| Tear | 39 | 44 | 40 | 42 | 43 |
| Aged | | | | | |
| T | 188 | 193 | 183 | 210 | 223 |
| E | 420 | 600 | 400 | 490 | 500 |
| Aged | | | | | |
| 300M | 112 | 63 | 113 | 110 | 120 |
| Shore A | 66 | 63 | 68 | 66 | 66 |

-Continued

Examples 6 to 10 (SBR — Low Sulfur)

|  | 6 | 7 | 8 | 9 | 10 |
|---|---|---|---|---|---|
| Flex |  |  |  |  |  |
| Orig. | 240 | 240+ | 240+ | 240+ | 240+ |
| Aged | 34 | 200 | 30 | 196 | 216 |
| GF |  |  |  |  |  |
| Orig. | 34.2 | 74 | 33.9 | 32.6 | 34.0 |
| Aged | 32.4 | 62 | 36.3 | 31.1 | 31.0 |
| Rebound |  |  |  |  |  |
| 25°C. | 62 | 56 | 60.1 | 62 | 60.9 |
| 100°C. | 74 | 59 | 66.4 | 70 | 68.3 |

Example 9 possessed aged T/E superior to that of MDB or MBTS (Examples 6 and 7) alone. The aged Flex was greatly superior to that of MDB while the Goodrich Flexometer data showed Example 9 to be quite superior to MBTS alone. Example 10 possessed aged T/E and aged Flex superior to either MDB or CBS (Example 8) alone.

Examples 11 to 15 (NBR — Low Sulfur)

|  | 11 | 12 | 13 | 14 | 15 |
|---|---|---|---|---|---|
| Sulfur | 0.3 | 0.3 | 0.3 | 0.3 | 0.3 |
| MDB | 3.0 |  |  | 1.5 | 1.5 |
| MBTS |  | 3.5 |  | 1.7 |  |
| CBS |  |  | 3.0 |  | 1.5 |
| OCT | 30 | 35 | 32 | 30 | 30 |
| Scorch | 30+ | 30+ | 30+ | 30+ | 30+ |
| T | 234 | 196 | 210 | 217 | 237 |
| E | 610 | 680 | 620 | 530 | 530 |
| 300M | 68 | 53 | 62 | 110 | 120 |
| Shore A | 66 | 66 | 66 | 64 | 64 |
| Tear | 50 | 47 | 48 | 49 | 51 |
| Aged |  |  |  |  |  |
| T | 204 | 168 | 190 | 204 | 207 |
| E | 390 | 470 | 450 | 420 | 440 |
| Aged |  |  |  |  |  |
| 300M | 155 | 70 | 60 | 154 | 156 |
| Shore A | 75 | 75 | 66 | 75 | 75 |
| Flex |  |  |  |  |  |
| Orig. | 101 |  |  | 107 | 104 |
| Aged | 70 |  |  | 81 | 88 |
| Oil Aged |  |  |  |  |  |
| T | 190 | 147 | 168 | 204 | 210 |
| E | 380 | 560 | 300 | 450 | 450 |
| 300M | 160 | 56 | 168 | 150 | 152 |
| Shore A | 50 | 47 | 51 | 52 | 53 |

Example 14 possessed aged T/E superior to MBTS (Example 12) alone and Flex superior to MBD (Example 11) alone. Example 15 showed aged T/E superior to Examples 11 and 13 (MDB and CBS, alone, respectively). Its Flex was also superior to MDB alone.

Formulation A was used with 2.75 parts of sulfur. A 0.30/0.30 MDB/MBTS combination possessed aged Flex and aged T/E superior to 0.60 part of either component alone. A 0.30/0.30 MDB/CBS combination possessed aged Flex and aged T/E superior to 0.60 part of either component alone.

Formulation B was used with 1.75 parts of sulfur. A 0.50/0.50 MDB/MBTS combination possessed Goodrich Flexometer, Flex (aged and original) and aged T/E characteristics which were superior to those of vulcanizates prepared using 1.0 part of either MDB or MBTS alone. For example, the original Flex of the combination was 230 while the Flex for the MDB was 175 and for the MBTS, 110. The original Flex for a 0.50/0.50 MDB/CBS combination was superior to that of either the MDB or CBS alone.

Formulation C was used with 1.75 parts of sulfur. The air aged and oil aged T/E as well as the aged Flex for a 0.40/0.40 MDB/MBTS combination were superior to the individual components. The same was true for a 0.40/0.40 MDB/CBS combination when compared with vulcanizates produced using its individual components alone.

Overall, all of the two-component systems tested generally have what could be considered an overall superior combination of physical properties. Although sometimes inferior in some properties, the vulcanizates prepared using the two-component system were always superior to any system with which it was concerned in at least one of the following properties: aged T/E, Flex (original or aged), or Goodrich Flexometer.

The aforementioned properties are quite important in various application. Flex is important in belt and tire applications. Aged T/E is important with regard to tires and high temperature belts and hose. Goodrich Flex properties would be considered where a polymer was to be used in a motor mount.

The other accelerator compounds described earlier herein could have been substituted for their counterparts in the preceding working examples to produce vulcanizates with a superior combination of physical properties.

Likewise, various other polymers could have been substituted for those used in the preceding working examples, such as cis-1,4 polyisoprene, cis-1,4 polybutadiene or ethylene/propylene/1,4-hexadiene polymers. Naturally, as the rubber is changed or a different loading is used, standard changes in the compounding recipe would be made to obtain optimum results.

The sulfur vulcanizable rubbers that will benefit from this invention include natural rubber and synthetic rubbers and mixtures thereof. Synthetic rubbers that can be improved by the practice of the present invention include all diene rubbers including the following elastomers, either alone or in blends, cis-1,4 polyisoprene, polybutadiene, including cis-1,4 polybutadiene, rubber copolymers of 1,3-dienes such as 1,3-butadiene, isoprene or 2,3-dimethyl-1,3-butadiene with other monomers, for example, styrene, acrylonitrile and methyl methacrylate. Ethylene propylene terpolymers (EPDM), i.e., with a non-conjugated diene, for example, terpolymers of ethylene propylene and dicyclopentadiene or 1,4-hexadiene or ethylidene norbornene can also benefit from the present invention. For maximum benefit, the EPDM polymer should be classified as "fast curing" or "ultra fast curing." In fact, for best results any polymer used should vulcanize readily. Chlorinated polymers which possess unsaturation such as polychloroprene will show improved vulcanizate properties when used in the practice of the present invention as will polyalkenamers such as polyoctenamer prepared by a ring opening process involving cyclooctene. Although it is generally preferred that the mole percent unsaturation of the polymer be at least 1.0 percent to 2.0 percent and higher, the source of the double bond must be considered. For example, EPDM polymers prepared using ethylidene norbornene as the termonomer vulcanize more readily than an EPDM polymer prepared using dicyclopentadiene as the termonomer.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur vulcanizable rubber containing 0.10 to 3.25 parts by weight of free sulfur per 100 parts by weight of rubber and 0.5 to 3.25 parts by weight per 100 parts by weight of rubber, of an accelerator system comprising
   A. 2-(morpholinodithio)-benzothiazole, and
   B. at least one benzothiazole accelerator having the following structural formula

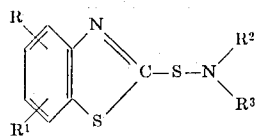

wherein R and R¹ are selected from the group consisting of hydrogen, nitro, chloro, alkyl radicals having from 1 to 4 carbon atoms and alkoxy radicals having from 1 to 4 carbon atoms and wherein R² is selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms, wherein R³ is selected from the group consisting of hydrogen and the radicals for R², and R² and R³ can be joined through a member selected from the group consisting of —CH₂— and —S— to constitute with the attached nitrogen group a heterocyclic radical wherein the weight ratio of A/B is ⅔ to 4/1, and wherein the total weight of sulfur plus accelerator system is from 2.25 to 5.50 parts by weight per 100 parts by weight of rubber.

2. The sulfur vulcanizable rubber according to claim 1 containing as an accelerator N-(cyclohexyl)-2-benzothiazylsulfenamide.

3. A sulfur vulcanizable rubber containing 0.10 to 3.25 parts by weight of free sulfur per 100 parts by weight of rubber and 0.5 to 3.25 parts by weight per 100 parts by weight of rubber, of an accelerator system comprising
   A. 2-(morpholinodithio)-benzothiazole, and
   B. at least one benzothiazole accelerator selected from the group consisting of
      N-(cyclohexyl)-2-benzothiazolesulfenamide,
      N-(t-butyl)-2-benzothiazolesulfenamide,
      N,N-(diisopropyl)-2-benzothiazolesulfenamide,
      N,N-(diethyl)-2-benzothiazolesulfenamide,
      N-(octyl)-2-benzothiazolesulfenamide, and
      2-(3-methylpiperidinothio)-benzothiazole,
wherein the weight ratio A/B is ⅔ to 4/1, and wherein the total weight of sulfur plus accelerator system is from 2.25 to 5.50 parts by weight per 100 parts by weight of rubber.

4. The sulfur vulcanizable rubber according to claim 3 wherein R³ is hydrogen.

5. The sulfur vulcanizable rubber according to claim 3 wherein the sulfur level is from 0.10 to 1.25 parts.

6. The sulfur vulcanizable rubber according to claim 3 wherein the sulfur level is from 1.25 to 3.25 parts.

7. A process of preparing a rubbery vulcanizate comprising heating the sulfur vulcanizable rubber of claim 1 at a vulcanizing temperature.

* * * * *